(12) United States Patent
O'Brian

(10) Patent No.: US 6,237,985 B1
(45) Date of Patent: May 29, 2001

(54) COVER SYSTEM FOR TRUCK CONTAINERS

(76) Inventor: Woody V. O'Brian, 2330 Womble Rd., Wilson, NC (US) 27893

( * ) Notice: Subject to any disclaimer, the term of this patent is extended or adjusted under 35 U.S.C. 154(b) by 0 days.

(21) Appl. No.: 09/490,140

(22) Filed: Jan. 24, 2000

(51) Int. Cl.[7] .................................................. B60J 11/00
(52) U.S. Cl. ...................... 296/98; 296/100.14; 160/23.1
(58) Field of Search ................... 296/100.14, 98, 296/107.16, 101, 111, 219, 100.01; 160/51, 55, 66, 72, 81, 23.1

(56) References Cited

U.S. PATENT DOCUMENTS

| Re. 36,135 | * | 3/1999 | O'Brian | 296/98 |
|---|---|---|---|---|
| 2,811,321 | * | 10/1957 | LaBarre | 242/399.1 |
| 3,515,428 | * | 6/1970 | Killion | 296/100 |
| 4,225,175 | * | 9/1980 | Fredin | 296/98 |
| 4,234,224 | * | 11/1980 | Rosenvold | 296/98 |
| 4,874,196 | * | 10/1989 | Goldstein et al. | 296/98 |
| 5,031,955 | * | 7/1991 | Searfoss | 296/98 |
| 5,752,735 | * | 5/1998 | Flemming et al. | 296/98 |
| 5,803,528 | * | 9/1998 | Haddad, Jr. | 296/100 |
| 5,829,818 | * | 11/1998 | O'Daniel | 296/98 |
| 5,944,374 | * | 8/1999 | Seafoss | 296/100.14 |
| 6,070,313 | * | 6/2000 | O'Brian | 29/240 |

\* cited by examiner

*Primary Examiner*—D. Glenn Dayoan
*Assistant Examiner*—Greg Blankenship
(74) *Attorney, Agent, or Firm*—Mills Law Firm PLLC

(57) ABSTRACT

An automatic cover system for open top containers includes a pair of tubular base frames fixedly connected to the truck frame having a main arm pivotally connected thereto. The main arm includes an extension extending into the base frame. A lower hydraulic actuator is disposed in the interior of the base unit and pivotally connected to the extension. The main arm is pivotal between a forward stop position and a rearward stop position. During movement between the stop positions, a relatively constant lever arm is established minimizing load fluctuations at the pivot connection. The upper end of the main arm is pivotally connected to the lower end of an extension arm. The extension arm includes an extension projecting below the main arm. An upper hydraulic actuator is mounted below the main arm and connected to the extension. The upper ends of the extension arms are operatively connected with a cover rolling system normally disposed on standards mounted at the forward end of the chassis in front of the container. By selectively actuating the cylinders, the arms may be cojointly moved above the front end of containers of varying heights, and rearwardly traversed to the rear of the container of varying lengths for overlying the open end of the container.

7 Claims, 8 Drawing Sheets

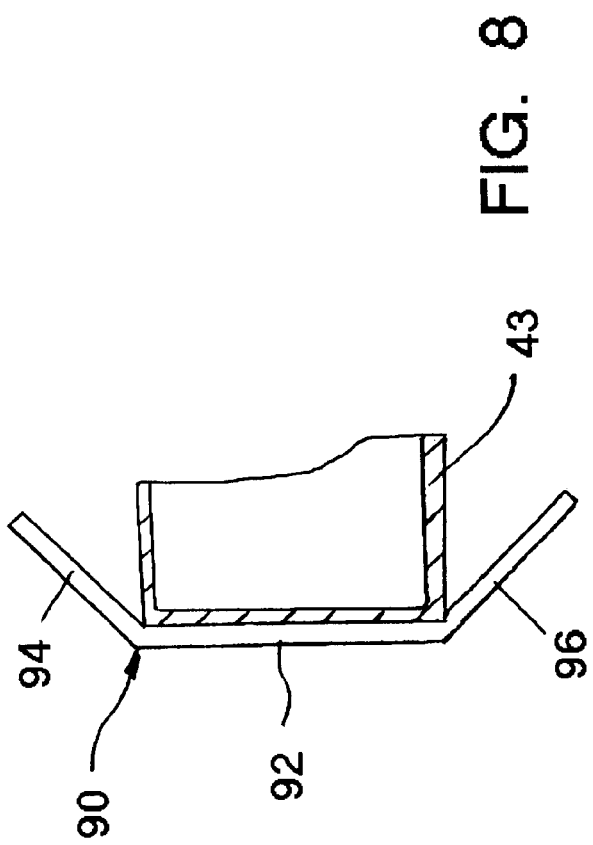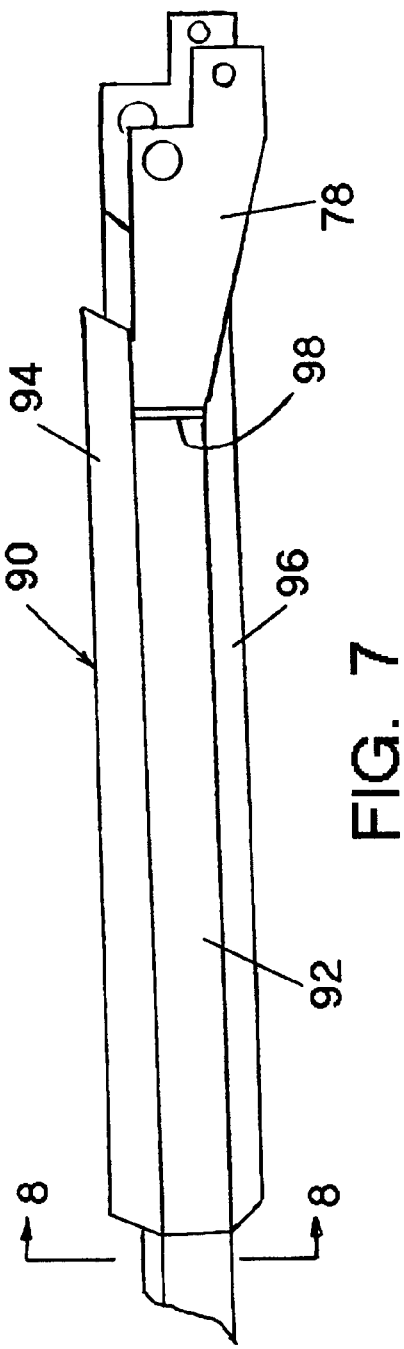

COVER SYSTEM FOR TRUCK CONTAINERS

FIELD OF THE INVENTION

The present invention relates to truck container covers and, in particular, an improved articulated cover system for covering the open top loaded truck containers during transportation.

BACKGROUND OF THE INVENTION

For many types of truck container shipments, it is required or desirable to cover the open top of the container to retain the cargo therein during transportation. Waste and other loose materials subject to spilling during hauling are particularly in need of such preventive measures. Inasmuch as the size of such containers vary widely, it is important that the covering apparatus accommodate the expected height, width and volumetric conditions without the need for customized apparatus.

A number of approaches in the art have sought to provide a spooled cover sheet that could be extended over the length of the load. Oftentimes, however, such apparatus, is not able to handle significant variations in length without structural modification. Such problems, to a large extent are overcome by the truck container covers as disclosed in U.S. Pat. Re. No. 36,135, issued in the name of the inventor of the present application. Therein, a pair of articulated arms is supported on either side of the container. Each arm has a base arm pivotally connected at a lower end to a base positioned midway along the container. A hydraulic cylinder spans the lower pivotal connection and is effective to pivot the base arm between a forward stowed position and a rearward covered position. An extension arm is pivotally connected to the upper end of the base arm. A second hydraulic cylinder spans the upper pivotal connection. The upper ends of the extension arms are operatively connected to a rolled cover. By selectively actuating the cylinders, the arms can upwardly pivot over containers of various heights, and during rearward pivotal movement may be closely positioned with respect to the open top of the container. Such a system provides flexibility in handling a wide variety of containers.

Nonetheless, certain problems can arise during normal loading and unloading of the container onto the vehicle. Vehicles such a wastehaulers are equipped to interchangeably handle a plurality of containers of varying sizes. Such containers are generally forwardly shifted upwardly along a tilted frame and thereafter pivoted to the horizontal position. During such positioning, unless accurately aligned, the container may impact various components of the cover system. The hydraulic cylinders are vertically and horizontally exposed and may be impacted, damaged and misaligned during normal container transfer. Moreover, the extension arms are particularly prone to damage during normal usage. The resulting damage oftentimes requires time consuming and costly repairs.

Further, the articulation system requires long stroke cylinders inasmuch as the cylinders are disposed in a second class lever system spanning the pivotal connection. Inasmuch as the lower arm may pivot in excess of 140°, the piston stroke to enable such movement is substantial. The actuators are accordingly quite expensive. Further, the lever arm disposition in such a system varies considerably during the allowed movement and is substantially foreshortened toward the end positions. This increases the loading on the pivots and arms during rolling and unrolling of the cover. Thus in addition to the piston stroke length, the actuator capacity must be sufficient to handle the loading without excessive wear and maintenance further increasing component costs. Additionally, the cylinder length and disposition, together with the required spacing between front and rear stop plates for limiting arm rotation, requires substantial base from length, increasing the system size, weight and cost.

In view of the foregoing, it is an object of the present invention to provide a two stage articulated covering system for open top containers resistive to damage during loading and unloading of the container.

Another object of the invention is to provide a compact, low profile two-stage articulated automated cover system for open top containers having a compact, shielded actuator system.

A further object of the invention is to provide an actuating system for selectively pivoting the arms of an articulated automated container covering apparatus, providing smooth, even movement of the arms during covering and uncovering of the container.

SUMMARY OF THE INVENTION

The above and other objects are accomplished in the present invention by an automated cover system wherein the actuators are integrated into the framework and shielded from deleterious contact with the container during loading and unloading of the container on the truck, operate as compact levered systems reducing actuator size and stroke, provide limited variations in the lever moment arms during articulation to increase smoothness in operation, and reduce joint loading and decrease maintenance requirements.

More particularly, the cover system comprises a pair of tubular base frames fixedly connected to the truck frame outboard of the container and positioned midway thereatlong. A lower main arm and upper extension arm are pivotally connected by brackets at the top of the base frame. The lower arm includes an extension that extends into base unit. A lower hydraulic actuator is disposed in the interior of the base unit and pivotally connected to the extension. The base unit thus shields the actuator and associated hydraulic lines from exterior damage. The main arm is pivotal between a forward stop position and a rearward stop position integrated into the bracket. During movement between the stop positions, a relatively constant lever arm is established minimizing load fluctuations at the pivot connection. The upper end of the main arm is pivotally connected to the lower end of an extension arm. The extension arm includes an extension projecting below the base arm. An upper hydraulic actuator is mounted below the main arm and connected to the extension. The extension arms and associated pivotal connections are inwardly spaced from the container by a shield thereby protecting the same from damage as the container is loaded and unloaded. This mounting results in a compact system for articulating the arms. The upper ends of the extension arms are operatively connected with a cover sheet rolling system normally disposed on standards mounted at the forward end of the truck frame in front of the container. By selectively actuating the cylinders, the arms may be cojointly moved above the front end of containers of varying heights, and rearwardly traversed to the rear of containers of varying lengths for positioning of the rear end of the cover.

DESCRIPTION OF THE DRAWINGS

The above and other objects and advantages of the invention will become apparent upon reading the following detailed description taken in conjunction with the accompanying drawings in which:

FIG. 7 is a perspective view of the deflection shield for the extension arm;

FIG. 8 is an enlarged fragmentary cross sectional view taken along line 8—8 in FIG. 7.

DETAILED DESCRIPTION OF THE PREFERRED EMBODIMENTS

The present invention relates to articulated covering systems for open top containers positioned on a truck for transportation and will be descriframe with reference thereto. Exemplary for background purposes of such a system is disclosed in U.S. Pat. Re. No. 36,135 issued in the name of the present inventor and describes in detail the two-stage hydraulically controlled pivoting arm system for deploying a tarp or cover over containers of varying heights and lengths. The details thereof are hereby incorporated by reference.

Figure 9:
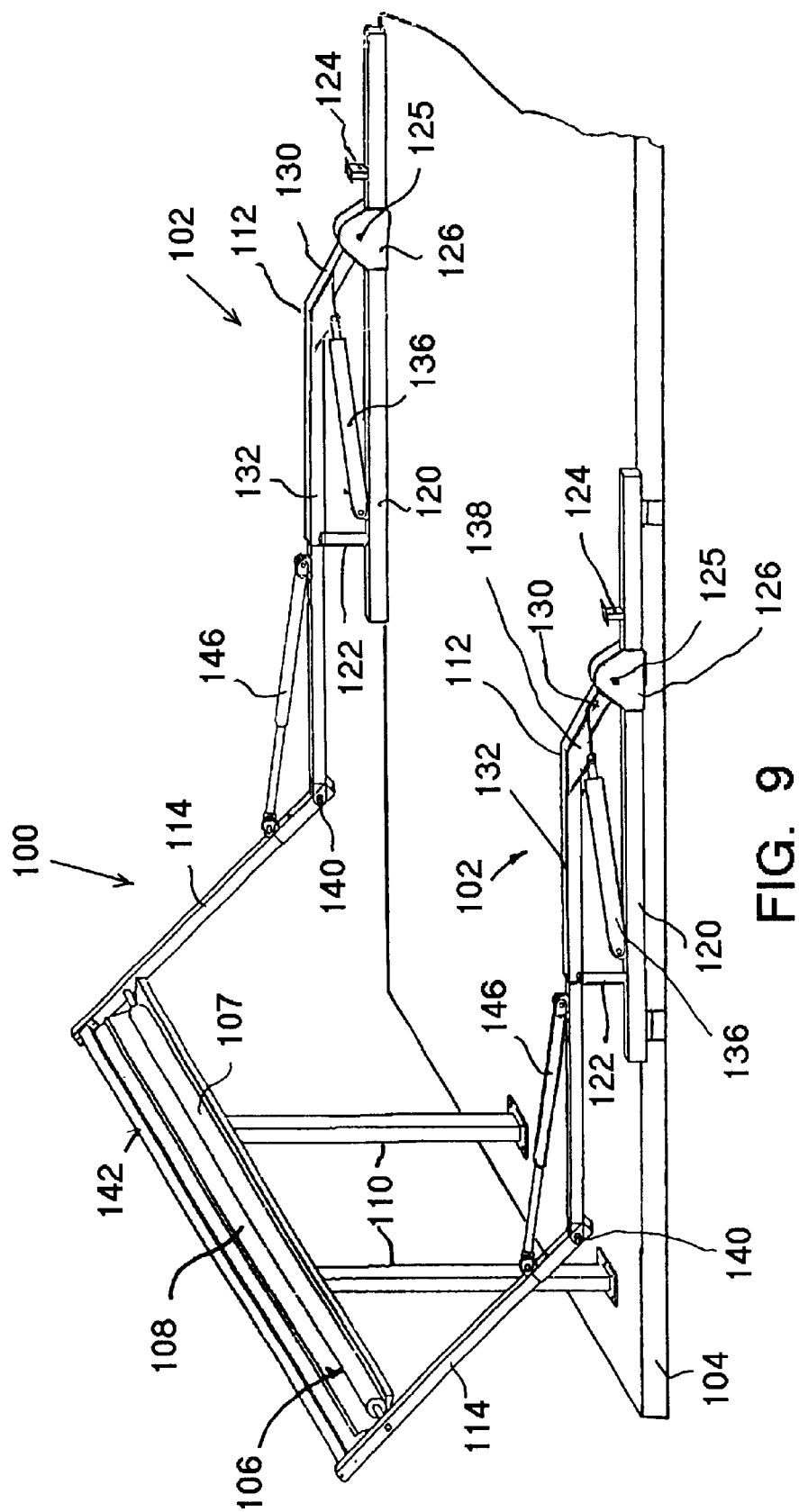
FIG. 9 is a perspective view similar to FIG. 1 showing a prior art cover system in the stowed condition.

Generally as shown in FIG. 9, a prior art cover system 100 comprises a pair of laterally spaced, articulated arms assemblies 102 mounted on either sides of a truck frame 104 carrying an open top container, not shown, disposed therebetween. A spooled cover assembly 106 including a flexible cover sheet or tarp 107 is transversely operatively connected between the upper ends of the arm assemblies 102. The cover assembly 106 is normally disposed in and supported by an upwardly opening, horizontal trough or cradle 108 adjustably vertically supported by a pair of vertical standards 110 mounted at the forward end of the truck frame 104.

Each arm assembly 102 includes a horizontal tubular base frame 120 fixedly secured to the sides of the frame 104, a main or base arm 112 and an extension arm 114. The base frame 120 includes a forward vertically extending front stop 122 and a rear stop 124. The main arm 112 is pivotally connected to the base frame 120 at pivotal connection 125 intermediate the stops 122, 124 by pivot bracket assembly 126. The main arm is dihedrally bent and includes a lower portion pivotally supported at the bracket assembly and an upper portion 132 generally horizontally disposed in the stowed condition resting on the front stop 122. A lower hydraulic linear actuator 136 is mounted on top of the base frame 120 adjacent the front stop 122 and pivotally connected to the main arm 112 at a bracket 138 fixedly connected at the juncture of the lower portion 130 and the upper portion 132. Operation of the lower actuator 136 by conventional control means, not shown, pivots the lower arm about a transverse axis between the illustrated stowed conditions engaging the forward stop rearwardly about the pivot connection to a rearward position engaging the rear stop 124. As such the actuator spans the pivotal connection in effecting such movement. At the limits of such movement, the piston axis is closely adjacent the pivotal axis resulting in a foreshortened lever arm greatly increasing the force required for movement.

The extension arm 114 is pivotally connected to the forward end of the main arm at transverse pivotal connection 140. The upper ends of the extension arm are interconnected by cross member 142. An upper hydraulic actuator 146 spans the pivotal connection and has the cylinder connected to the top surface of the base arm and the piston connected at the top surface of the extension arm 114. Operation of the actuator is effective to pivot the extension arm between an extended position is aligned with the main arm and a retracted position determined by the piston stroke. As with the lower pivot, at the ends of the operative articulation, the piston axis is closely adjacent the pivot axis resulting in a foreshortened level arm that greatly increases the forces for initiating movement. Further, the extension arm may be directly impacted by the pivoting container resulting in damage thereto. In operations, the actuators are cojointly selectively actuated to unfurl the spooled cover over the open top of the container as descriframe in the aforementioned patent.

Figure 1:
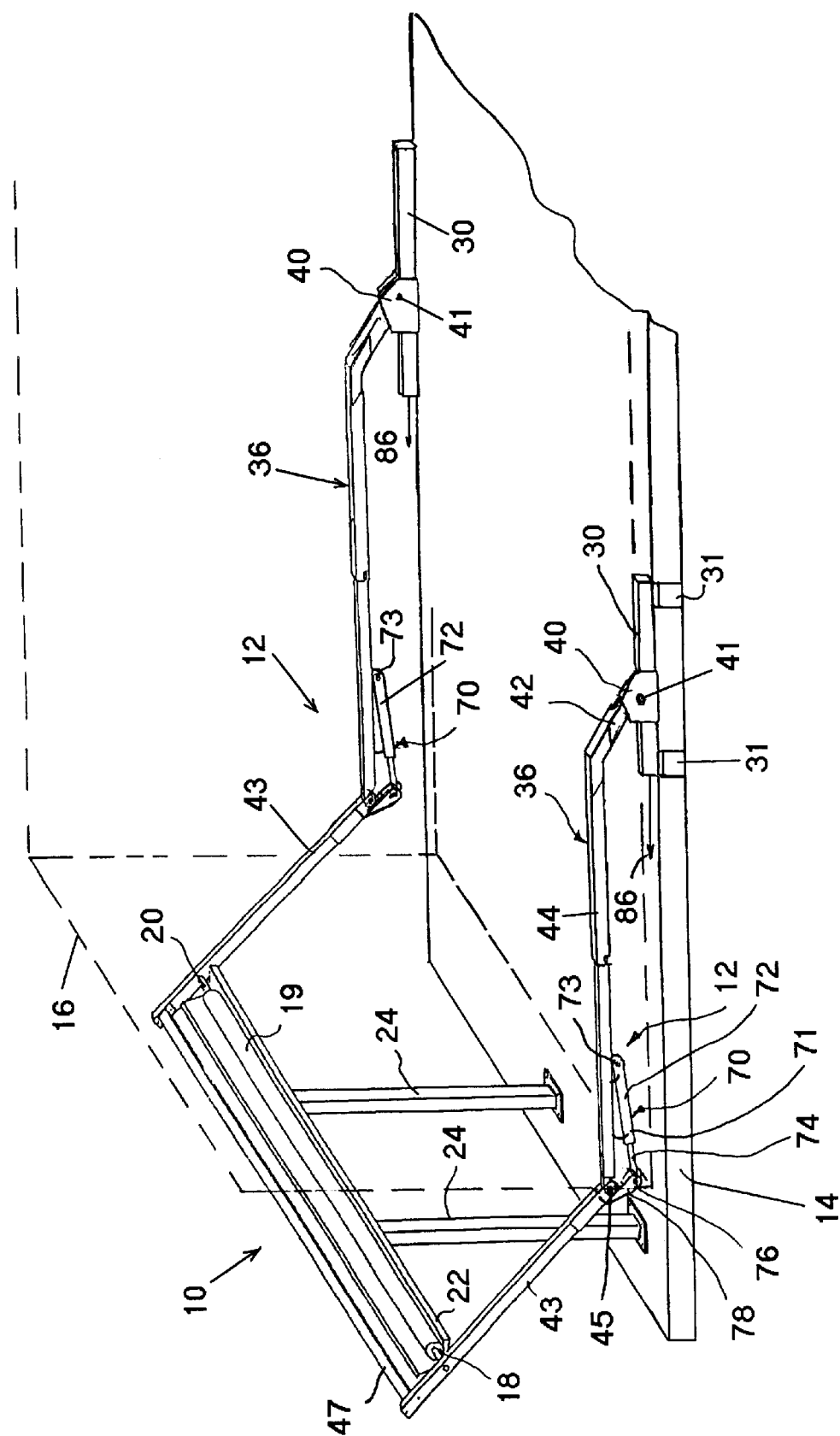
FIG. 1 is a perspective view of an articulated cover system in accordance with the present invention mounted on a truck with the cover in the stowed condition.

Referring to FIG. 1, the present improves on the foregoing by providing a compact, shielded two-stage articulated cover system 10 for covering the open top of a container 16, shown in dashed lines, mounted on the frame 14 of a truck for transporting loose material, such as waste products.

The cover system 10 comprises a pair of laterally spaced, articulated arms assemblies 12. The arm assemblies 12 are mounted on opposite sides of the truck frame 14. In use, the open top container 16 is disposed transversely between the arm assemblies 12. Depending on the truck design or customer material handling equipment, the track frame or tracks thereon may be rearwardly extended and tilted in a conventional manner to engage the container and thereafter are forwardly retracted and tilted downwardly to position the container in transportation position on the truck frame 14. A spooled cover assembly 18 is transversely operatively connected between the upper ends of the arm assemblies 12. The cover assembly 18 includes a flexible cover sheet 19, such as a tarpaulin, furled onto a horizontal spool 20. The cover sheet 19 is of sufficient size to cover the open tops of a range of container sizes. As illustrated the cover sheet is carried on a spool on the arm assemblies.

The cover assembly 18 is normally disposed in and supported by an upwardly opening, horizontal trough or cradle 22 adjustably vertically supported by a pair of vertical standards 24 mounted at the forward end of the truck frame 14. Alternatively, the cover assembly 18 may be rotatably supported on the standards and the free end of the cover sheet attached to the front end of the arm assemblies 12. In either format, the cover sheet 19 is unrolled as the cover system traverses the open top of the container.

Each arm assembly 12 includes a base frame 30 fixedly secured to the sides of the frame 14 by brackets 31 or other suitable means. The base frame 30 is pivotal between a forward stop position and rearward stop position as descriframe below. A main or lower arm 36 is pivotally connected at a lower end to the base frame 30 by pivot bracket assembly 40 at pivot connection 41. The upper end is pivotally connected to an extension arm 43 at a pivot connection 45. The main arm 36 is dihedrally bent in a vertical plane and includes a lower portion 42 pivotally supported at the bracket assembly 40 and an upper portion 44 generally horizontally disposed in the stowed forward condition.

Figure 3:
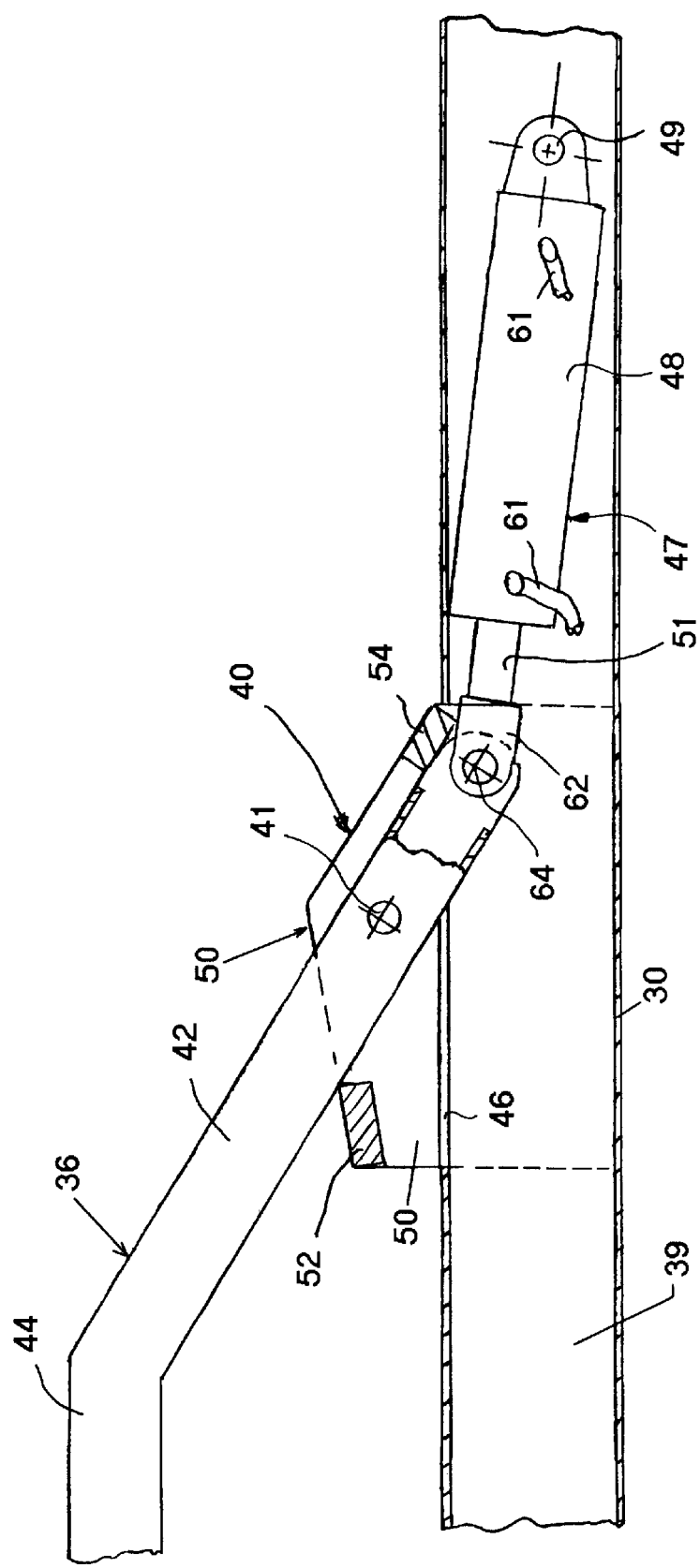
FIG. 3 is a fragmentary cross sectional view of the base arm actuating system in the stowed condition.

Referring additionally to FIG. 3, the base frame 30 comprises an elongated rectangular tube having peripheral walls defining a longitudinal passage 39. A suitable commercially available component is a 4-inch square, 12 gage welded steel tube. In the vicinity of the bracket assembly 40, the top wall of the tube is removed to provide a vertical opening 46 communicating with the passage 39. A dual acting hydraulic linear actuator 47 is longitudinally disposed in the passage 39 via access through the opening 46. The actuator 47 includes a cylinder 48 pivotally connected at 49 to the base frame 30. With such bracket and actuator locations the overall length of the base frame 30 may be substantially shorter than the above descriframe cover system.

Figure 4:
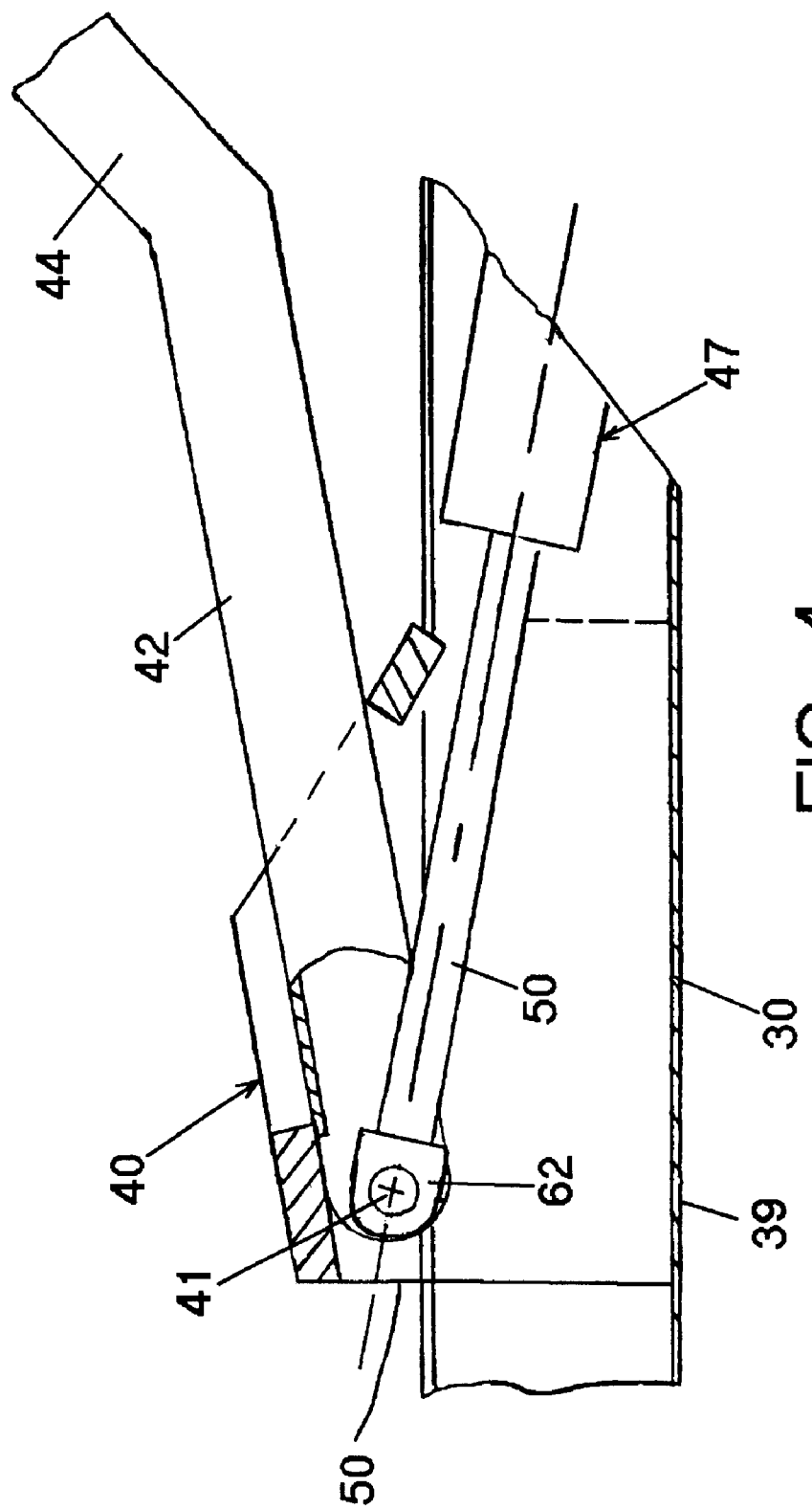
FIG. 4 is a fragmentary cross sectional view of the base arm actuating system in the extended condition.

The bracket assembly 40 comprises a pair of pentagonal plates 50 welded to the side walls of the base frame 30 and interconnected by cross plates 52 and 54. As shown in FIG. 3, the lower portion 42 of the main arm engages the rear of cross plate 52 at the retracted piston stroke to establish the stowed forward position. As shown in FIG. 4, the lower portion 42 of the main arm engages the front cross plate 54 at the extended piston position to establish the extended rearward position for the cover. By integrating the stops into the bracket assembly, the overall length of the base frame is substantially reduced.

Figure 6:
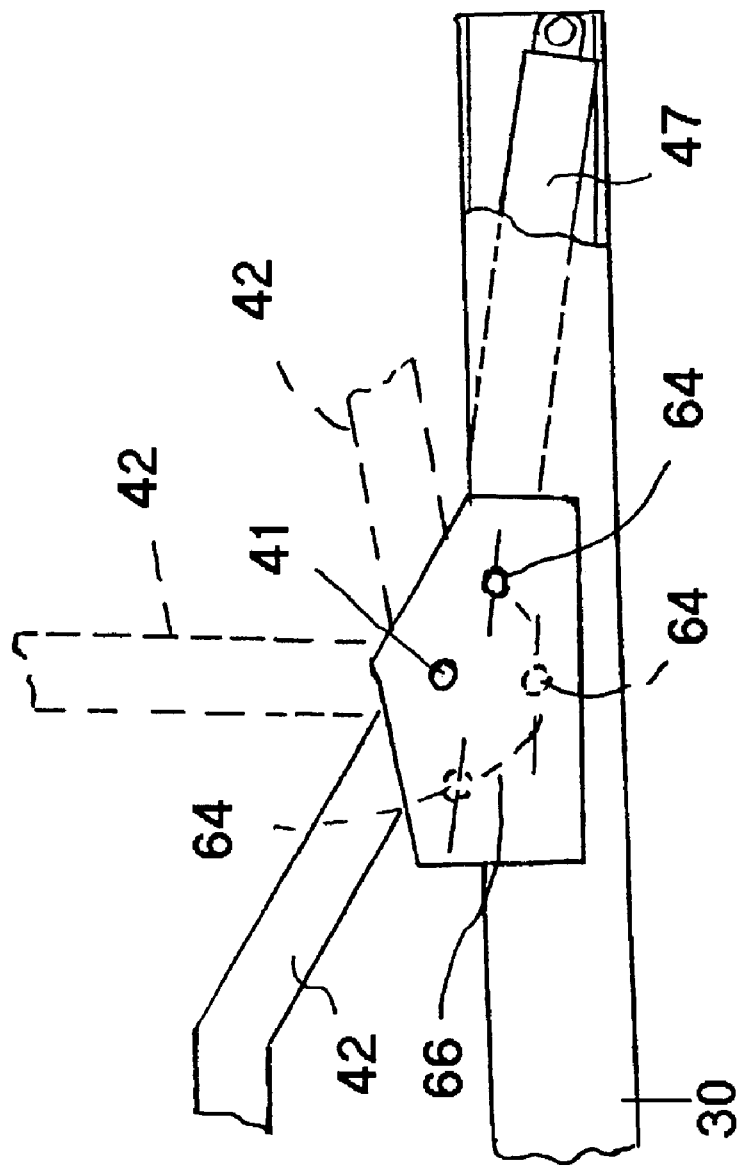
FIG. 6 is a series of side elevational views illustrating the pivoting of the lower arm between the stowed condition and the extended condition.

The pivot connection 41 is located above the top wall of the base frame 30 longitudinally between the ends of the opening 46 and longitudinally spaced from the lower end of the lower arm 42. Adjacent the lower end, the top and bottom walls of the lower arm are removed and transversely pivotally connected by pin connection 64 to a clevis 62 at the end of the piston 51 of the actuator 47. The hydraulic lines 61 for the actuator 47 are routed through the passage 39 and exit the forward end of the base frame 30 for connection to the actuator control system, not shown. The control system is effective for pivoting the main arm between the stowed position illustrated in FIG. 3 and the extended position illustrated in FIG. 4. In operation, the pin connection 64 traverses the path 66 as shown in dashed lines in FIG. 6, during which the lever arm of the piston axis relative to the pivot axis 41 remains relatively constant, providing for smooth actuation and reduced actuator force in comparison with the prior art system descriframe above.

Figure 5:
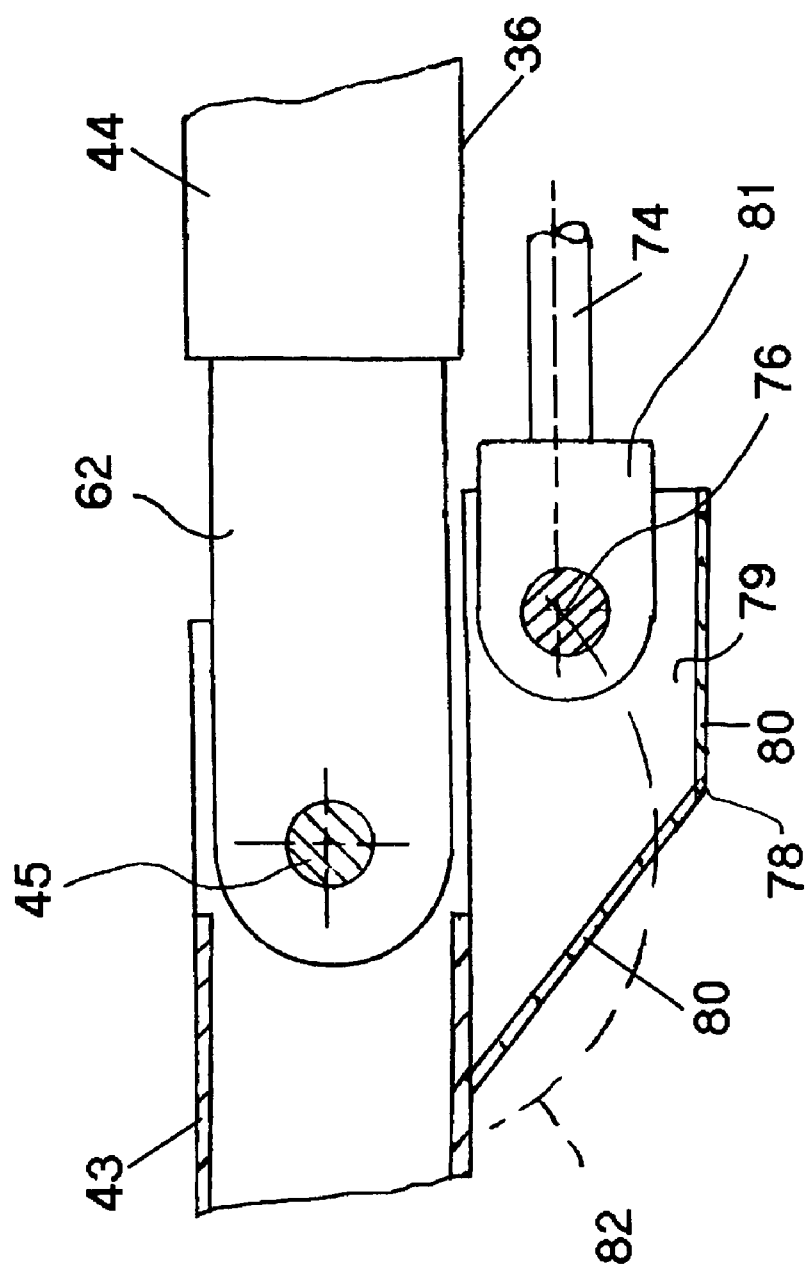
FIG. 5 is a fragmentary cross sectional view of the extension arm actuating system in the extended condition.

Referring additionally to FIG. 5, the lower end of the extension arm 43 is pivotally connected to the clevis 62 of the upper arm portion 44 at transverse pivotal connection 45. The upper ends of the extension arms 43 are interconnected by cross member 47. An upper hydraulic actuator 70 including hydraulic lines 71 is disposed below the upper arm portion 44 and the extension arm 43. The actuator 70 has a cylinder 72 piston rod 74 pivotally connected to the upper arm portion 44 and a piston rod 54 at transverse pin connection 76 to an extension bracket 78 connected to and depending downwardly from the extension arm 43 adjacent the pivotal connection 45. The extension arm 43 is a rectangular welded tubes having the top and bottom walls removed adjacent the lower end for facilitating the pin connection 45. The extension bracket 78 extends below the pin connection and includes a pair of side plates 79 welded to the sides of the extension arm 43 and interconnected by cross plates 80. The pin connection 76 is connected between the side plates 79 and a clevis 81 connected to the piston of the upper actuator 70. Upon operation of the actuator, the extension arm 43 pivots about connection 45 and the connection 76 traverses the arc 82 illustrated in the dashed lines. Accordingly, the extension arm 43 has a pivotal freedom of rotation between an extended position is aligned with the lower arm, as shown in FIG. 5, and a retracted position determined by the piston stroke. During such freedom of movement, it will be appreciated that a relatively constant lever arm is established resulting in a smooth, short stroke pivoting with reduced capacity requirements in contrast to the prior art system desciframe above. The hydraulic lines for the upper actuator are routed internally of the arm assemblies to the base frame frontally exiting at 86 for connection with the conventional actuator controls 87, preferably located at the front of the truck be adjacent the driver's side of the truck cab.

In order to protect the arm assemblies and in particular the upper actuator 70 and the extension arm 43 from damage during loading, and unloading of the container and during normal operation, as shown in FIGS. 7 and 8 a impact deflector shield 90 may be attached by welding or other suitable fasteners longitudinally along the extension arm 43. The shield 90 is located inboard of the arm assemblies 12 and is interposed between the container and the extension arm 43. The shield 90 includes a base wall 92 affixed to the inner side wall of the extension arm 43 and outwardly angled upper and lower flanges 94 and 96 respectively. The end of the shield adjacent the extension bracket 78 included an end notch 98 for partially straddling the bracket. Accordingly as the container is pivoted on the truck frame, particularly in containers having projecting components such as hinges on the side thereof, the shield 90 is effective upon contact to outwardly deflect the extension arm to prevent direct impact and resulting bending or deformation thereof. Additionally, the shield 90 provides structural reinforcement for the extension arm.

Figure 2:
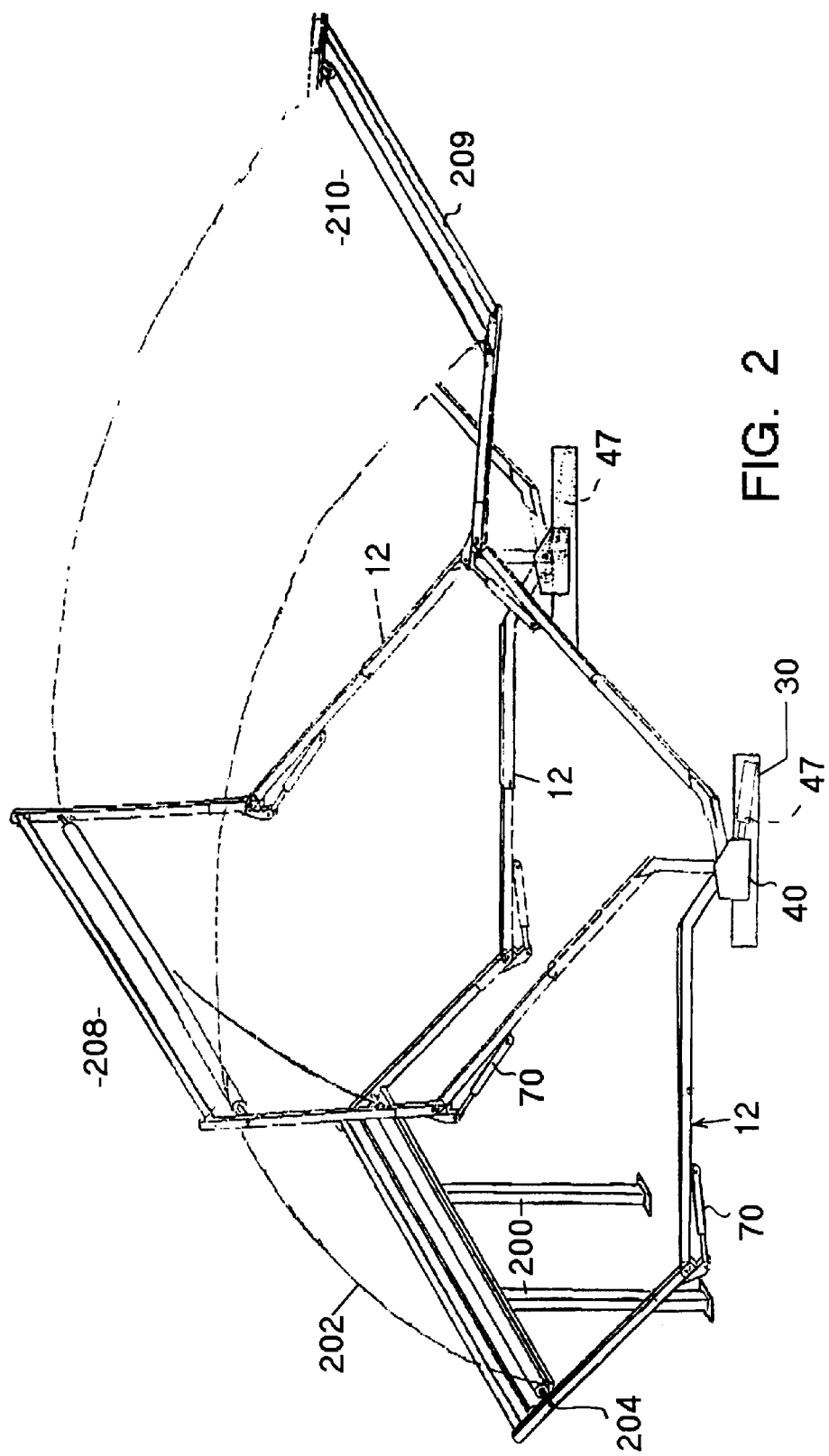
FIG. 2 is a series of perspective views of the cover system during varying stages of actuation for covering an open top container.

Referring to FIG. 2, the actuators 47, 70 may be cojointly selectively actuated to unfurl the spooled cover over the open top of the container as sequentially illustrated. As the arm assemblies 12 pivot rearwardly from the stowed condition on standards 200, the cover sheet 202 unwinds from the roller assembly 204 to progressively overlie the open top the container to an intermediate condition 208. At the rear of the container, the arm assemblies are disposed such that the crossbar 209 engages the rear upper rim of the container in an extended condition 210 and the cover sheet completely encloses the container top. The aforementioned sequence is reversed prior to unloading at destination.

As discussed above, the hydraulic lines for the actuators are routed through the tubular arms. The various lines exit the front end of the base units at 86. The lines are operatively connected in a conventional hydraulic system typically comprising a holding tank supplied with fluid under pressure by a pump powered by the truck engine. The individual actuators may be selectively controlled by individual valving or coupled to a joystick controller for cojoint movement of the actuators.

Having thus descriframe a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A cover system for extending and retracting a flexible cover sheet over an open top container positioned on a truck frame, said cover system comprising:

roller means having said cover sheet attached thereto;

support means connected with the truck frame for supporting said roller means in a stowed condition;

a pair of elongated tubular base frame members connected to said truck frame on opposed longitudinal sides of the container;

aperture means in the top of each of said base frame members between the ends thereof;

bracket means connected to said frame members adjacent said aperture means;

first arm members having lower ends projecting through said aperture means into said base frame members;

first pivot means pivotally connecting said first arm members to said bracket means above said base frame members for pivotal movement about a lower transverse axis;

first linear actuator means operatively disposed within said base frame members and operatively connected to said lower end of said first arm members for pivoting said first arm members about said lower transverse axis;

second arm members operatively connected at upper ends to said first arm members;

second pivot means pivotally connecting said second arm members to said first arm members at a location between the upper ends and the lower ends of said second arm members for pivotal movement about an upper transverse axis; and second linear actuator means connected at one end to lower surfaces of said first arm members and at the other end to the lower ends of said second arm members, said second actuator means being effective to pivot said second arm members relative to said first arm members about said upper transverse axis, whereby selective operation of said actuator means articulate said arm members about said transverse axes and thereby longitudinally traverse said cover sheet with respect to said container from said stowed condition to an extended condition at the rear of the container.

2. The cover system as recited in claim 1 including shield means connected to said second arm members and disposed inboard thereof adjacent the container.

3. In a vehicle removably carrying a container having an open top on a horizontal frame, a cover system for extending and retracting a flexible cover sheet over the open top of the container, said cover system comprising: (a) a pair of elongated tubular base frames having longitudinal passages, said base frames connected to the frame on opposed longitudinal sides of the container, said base frames having an upwardly opening elongated slot formed therein; (c) transversely spaced bracket plates connected to said base frames and extending vertically thereabove; (d) a main arm associated with each base frame, said main arm having a lower end projecting through said slot into said passage; (e) a first pivotal connection between said main arm and said bracket plates above said top wall of said base frame defining a lower transverse axis; (f) first hydraulic actuators operatively disposed within said passages and operatively connected for pivoting first arm members about said lower transverse axis; (g) a vertically adjustable support stand connected to the frame at the front end of the container; (h) a roller assembly carrying a cover sheet operatively connected to said support stand; (i) an extension arm operatively connected at an outer end with said roller assembly for extending said cover sheet; (j) second pivot means pivotally connecting an inner end of said extension arm to said main arm for pivotal movement about an upper transverse axis; (k) a second hydraulic actuator connected at one end to a lower surface of said first arm member and at the other end to said extension arm, said second hydraulic actuator being effective to pivot said extension arm relative to said main arm about said upper transverse axis, and (l) means for selectively operating said actuators to articulate said arms about said transverse axes to thereby longitudinally traverse said cover sheet with respect to the open top of the container.

4. A two-stage articulated cover apparatus for the open top of a container removably carried on a truck frame, said cover apparatus comprising: a pair of articulated arm assemblies; each of said articulated arm assemblies comprising an elongated base frame member connected to said truck frame on opposed longitudinal sides of the container, a bracket assembly connected to and vertically extending above said base frame members between longitudinal ends thereof, a main arm pivotally connected to said bracket assembly at a first transverse pivotal connection vertically above said base frame member adjacent one end thereof, said main arm member having a first extension projecting below an upper surface of said base frame member, first linear actuating means operatively connected between said first extension and said base frame member for rotating said main arm relative to said base frame between a front position and a rear position, stop means coacting with said main arm to establishing said stowed position and said extended position, a secondary arm member having a first end operatively connected at the other end of said main arm at a second transverse pivotal connection, said secondary arm having a second extension projecting beyond said second transverse pivotal connection and below said main arm; second linear actuator means operatively connected between a lower surface of said main arm and said second extension for rotating said secondary arm relative to said main arm between a first position and a second position; a vertically extending support member connected to said truck frame including a transverse cover support; roller means including a cover sheet operatively connected between said cover support and the outer ends of said secondary arms and carried by said cover support at said front position, selective actuation of said first linear actuator means and said second linear actuator means being effective to rotate said arm assemblies between said front position and said rear position for deploying said cover sheet in overlying relationship with the open top of the container.

5. The cover system as recited in claim 4 wherein said stop means coact between said bracket assembly and said main arm.

6. The cover system as recited in claim 4 wherein said roller means are carried by said secondary arm and a free end of said cover sheet is connected to said cover support.

7. The cover system as recited in claim 4 including a deflector shield carried on an inner surface of said second extension of said secondary arm in spaced relation with said container.

* * * * *